(12) United States Patent
Kimura et al.

(10) Patent No.: US 8,465,109 B2
(45) Date of Patent: Jun. 18, 2013

(54) CORE BAR FOR RUBBER CRAWLER

(75) Inventors: Hideki Kimura, Fukuyama (JP);
Satoshi Morishita, Fukuyama (JP)

(73) Assignee: Fukuyama Gomu Kogyo Kabushiki Gaisha, Fukuyama (JP)

( * ) Notice: Subject to any disclaimer, the term of this patent is extended or adjusted under 35 U.S.C. 154(b) by 543 days.

(21) Appl. No.: 11/887,475

(22) PCT Filed: Mar. 30, 2005

(86) PCT No.: PCT/JP2005/006027
§ 371 (c)(1),
(2), (4) Date: Aug. 12, 2009

(87) PCT Pub. No.: WO2006/103753
PCT Pub. Date: Oct. 5, 2006

(65) Prior Publication Data
US 2010/0013297 A1   Jan. 21, 2010

(51) Int. Cl.
*B62D 55/24* (2006.01)
(52) U.S. Cl.
USPC .......................................... 305/177; 305/171
(58) Field of Classification Search
USPC .................... 305/167, 170–172, 177
See application file for complete search history.

(56) References Cited

U.S. PATENT DOCUMENTS

| | | | |
|---|---|---|---|
| 6,106,083 A * | 8/2000 | Ono .............................. | 305/171 |
| 6,170,925 B1 * | 1/2001 | Ono .............................. | 305/177 |
| 6,568,769 B1 * | 5/2003 | Watanabe et al. ............. | 305/171 |
| 6,652,044 B1 | 11/2003 | Katoh et al. | |
| 6,709,077 B2 * | 3/2004 | Watanabe et al. ............. | 305/177 |
| 7,641,293 B2 * | 1/2010 | Doyle ............................ | 305/171 |
| 2010/0096916 A1 * | 4/2010 | Kato et al. .................... | 305/170 |

FOREIGN PATENT DOCUMENTS

| JP | 7-4271 | | 1/1995 | | |
|---|---|---|---|---|---|
| JP | 11-105754 | | 4/1999 | | |
| JP | 11-165663 | A | 6/1999 | | |
| JP | 2000-313371 | A | 11/2000 | | |
| JP | 2001-048067 | A | 2/2001 | | |
| JP | 2001-334970 | A | 12/2001 | | |
| JP | 2002-104258 | A | 4/2002 | | |
| JP | 2003-335275 | | 11/2003 | | |
| JP | 2007-22328 | | * 1/2011 | ................... | 305/177 |

OTHER PUBLICATIONS

Machine translation of JP11-165663.*

* cited by examiner

*Primary Examiner* — Jason Bellinger
(74) *Attorney, Agent, or Firm* — Merek, Blackmon & Voorhees, LLC

(57) ABSTRACT

A core bar for a rubber crawler capable of enhancing the durability of the rubber crawler by preventing an end-cutting phenomenon in which cracking is generated at the end of the core bar in a crawler lateral direction of the core bar embedded in the rubber crawler when the rubber crawler rides over a curbstone at the road shoulder of a paved road, stones and obstacles on irregular ground, and is pressed in a lateral direction. In the core bar (1) constituting the rubber crawler (3) and embedded in a rubber crawler body (3*a*), an enlarged width part (2) is formed by elongating the longitudinal end part of the core bar (1) beyond the width dimension of the core bar.

10 Claims, 14 Drawing Sheets

CORE BAR FOR RUBBER CRAWLER

TECHNICAL FIELD

The present invention relates to a rubber crawler for being mounted on an endless track traveling device for farm machines, construction machines, engineering work machines and industrial vehicles, such as transportation vehicles, and particularly to prevention of an end-cutting phenomenon generated on the ends, in a lateral direction, of a rubber crawler.

TECHNICAL BACKGROUND

Rubber crawlers, in addition to conventional iron crawlers, have been used as endless track traveling devices for mobile construction machine vehicles, etc.

A rubber crawler in FIGS. 13A and 13B is an example of conventional rubber crawlers. A rubber crawler C comprises an endless belt H formed from a rubber elastic body, core bars M embedded in the belt, and tensile reinforcements S.

A tensile reinforcing layer in which a plurality of tensile reinforcements S are parallel to a crawler circumferential direction and side by side in a row within a crawler lateral direction is provided in the endless belt H of a rubber crawler main body. The core bars M are embedded at the inside circumference of the tensile reinforcing layer in the rubber crawler main body, each having guide protrusions K for preventing the crawler from coming off of the traveling device on the inside circumference of the crawler.

FIG. 13A is a side view showing the whole of the rubber crawler C, and FIG. 13B is a perspective view, partly in section, to explain the structure of the rubber crawler.

SUMMARY OF THE INVENTION

Problems to be Solved by the Invention

Recently, an industrial construction machine having a traveling device with a rubber crawler has been often used near curbstones at the shoulder of a paved road and on irregular ground in which many stones are present. In this case, when the rubber crawler rides over stones, obstacles and curbstones (see FIG. 14A), or is pressed in the lateral direction (see FIG. 14B), distortion is generated on the end part of the rubber crawler in a longitudinal direction of the core bar (a crawler lateral direction) embedded in the rubber crawler, and the rubber elastic body in this portion is broadly deformed. When this is repeated, fatigue destruction in the rubber elastic body is sometimes caused.

The destruction of the rubber elastic body proceeds whenever such a situation is repeated, and at last, a large crack F will be generated in the rubber crawler main body. Such a phenomenon is called "end-cutting", and it causes trouble.

If the rubber crawler travels under this situation, the distortion is apt to concentrate at the ends in the width direction of the core bar (the crawler circumferential direction) to bring about cracking rubber when rolling wheels of the traveling device roll from one side to the other side, in the crawler circumferential direction, on the guide protrusions of the core bars of the rubber crawler.

Means to Solve the Problem

The present invention aims to solve the above-mentioned problems by reducing the concentration of the distortion generated around the longitudinal end parts of the core bar (the crawler lateral direction), taking relieving measures to cope with the distortion, and preventing the end-cutting of the rubber crawler.

The rubber crawler of the invention comprises an endless belt formed from a rubber elastic body and so on, a plurality of core bars, and tensile reinforcements embedded in the rubber elastic body.

The plurality of tensile reinforcements are parallel to the crawler circumferential direction and side by side in a row within the crawler lateral direction, the tensile reinforcements being embedded in a rubber crawler main body to form a tensile reinforcing layer. The core bars are embedded at the inside circumference of the tensile reinforcing layer in the rubber crawler main body, each core bar having guide protrusions for preventing the crawler from coming off of the traveling device on the inside circumference of the crawler.

The invention aims to relieve the concentration of the distortion generated around the longitudinal end parts of the core bar by elongating the longitudinal end parts of the core bar (the crawler lateral direction) in the width direction of the core bar (the crawler circumferential direction) beyond the width dimension of the core bar. By the "width dimension" of the core bar is meant the width of the core bar laterally inside, in the crawler lateral direction, the longitudinal end parts and exclusive of any protrusions extending in the width direction of the core bar.

In the rubber crawler of the invention, it is preferable that the core bar is provided with partial inclinations (preferably more than half of the thickness of the core bar), or overall inclinations, toward the tread side of the crawler by diminishing the thickness of the ends of the enlarged core bar toward the external end edge, or the end edges of the core bar are bent toward the side away from the tread, so that the inclinations face the tread side.

The core bar in the invention can be used as a core bar for caterpillar band pads of a caterpillar band pad type rubber crawler whose base is composed of connected track links combined a pair of track links, a skeletal part comprising blocks and bars, caterpillar band pads comprising core bars and a caterpillar band main body, in addition to an integrated rubber crawler of an endless belt made from rubber elastic body. Therefore, the end-cutting phenomenon can be prevented similarly.

Effect of the Invention

In the invention, the longitudinal end parts of the core bar (the crawler lateral direction) embedded in the rubber crawler are enlarged in the width direction of the core bar (the crawler circumferential direction) by elongating the longitudinal end parts beyond the width dimension of the core bar, thereby diminishing the weight per unit width (the unit area). According to this, the end-cutting prevention can be enhanced. The end-cutting of the rubber crawler is effectively prevented, thereby enhancing the durability of the rubber crawler.

The end-cutting prevention is enhanced by facing the broad inclinations of both front and back corneous parts of the end parts in the width direction of the core bar toward the tread side. Besides, the durability can be further enhanced by diminishing the thickness of the ends of the width direction of the core bar toward the external end edge, as well as by bending them toward the side away from the tread so that the inclinations face the direction of the tread side of the crawler.

PREFERRED EMBODIMENT OF THE INVENTION

Figure 1A:
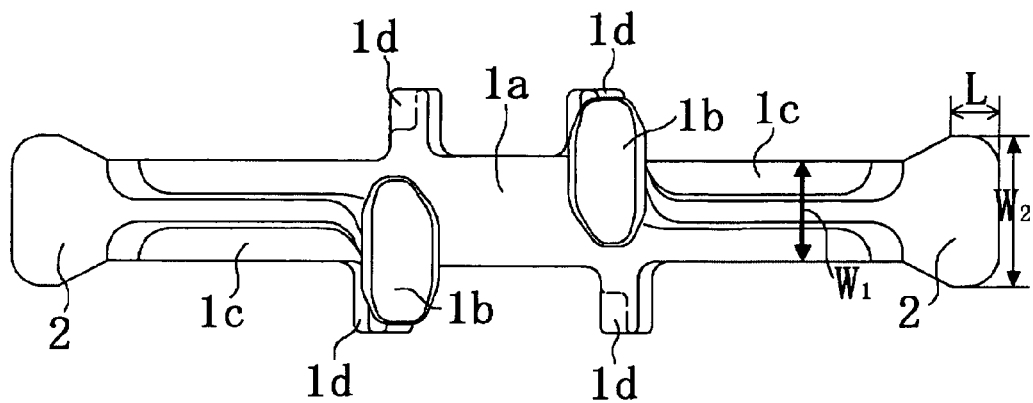
FIG. 1A is a plan view of an inside circumference of a first embodiment of a core bar according to the present invention.

A rubber crawler of the invention comprises an endless belt forming a rubber crawler main body, a plurality of core bars embedded in the belt, and tensile reinforcements.

The belt is made from urethane rubber, thermoplastic resin (such as semi hard and soft polyvinyl chloride), or rubber composition (compounded rubber) in which a reinforcing agent (carbon black, white carbon, etc.), antioxidant, vulcanization accelerator assistant, activator, tackifier, vulcanization accelerator or cross link agent such as sulfur or organic peroxide are blended in natural rubber, synthetic rubber (IR, SBR, BR, NBR, IIR, EPDM etc.,), or original rubber in which natural rubber and synthetic rubber are blended.

The tensile reinforcements comprise a plurality of steel cords parallel to the crawler circumferential direction, put side by side in a row within the crawler lateral direction, and embedded in the belt to form a tensile reinforcing layer.

The core bars are embedded in the crawler on the inside circumference of the tensile reinforcing layer at a fixed interval, and guide protrusions for preventing the crawler from coming off the traveling device are provided on the core bars so as to protrude toward the inside circumference of the crawler.

In addition, generally, each core bar has an engagement part for engaging with a driving unit of the traveling device formed in a longitudinally central portion, the guide protrusions for preventing wheels from coming off, which are formed to the outside of the engagement part in the longitudinal direction of the core bar, and wing parts formed to the outside of the guide protrusions. A protrusion for preventing wheels from coming off is occasionally formed to prevent the rubber crawler from shearing laterally.

The core bar of the invention is characterized in that the longitudinal end parts of the wing parts of the core bar are elongated beyond the width dimension of the core bar to be broadened in the width direction thereof. By the "width dimension" of the core bar is meant the width of the core bar laterally inside, in the crawler lateral direction, the longitudinal end parts and exclusive of any protrusions extending in the width direction of the core bar.

According to the rubber crawler of the invention, when the rubber crawler rides over stones and curbstones, the distortion generated on the longitudinal end parts of the core bar is dispersed by embedding the core bars broadened in the width direction in the belt of the rubber crawler main body so that the longitudinal end parts of the wing parts of the core bar are elongated beyond the width dimension of the core bar. Rubber destruction can be prevented by relieving the distortion concentration, and the end-cutting can be effectively diminished. Therefore, the durability of the rubber crawler can be enhanced.

In the invention, it is preferable to construct the core bar so that the thickness of the end parts of the core bar is diminished toward the external end edges to form inclinations facing the tread side of the crawler, and broadened portions of the wing parts of the core bar are bent toward the side away from the tread so that the inclinations face the tread side.

Although the inclinations and the bent parts may be provided on either of the end parts in the width directional or in the longitudinal direction of the core bar of the broadened end portions of the core bar, it is preferable to provide the inclinations and the bent parts on both end parts in the width direction and in the longitudinal direction of the core bar. Besides, they are preferably formed in a navicular shape.

Accordingly, the distortion in both broadened front and rear corneous parts in the width direction of the core bar can be relieved, and besides, the durability against end-cutting can be enhanced.

Example 1

The embodiments of the invention will be explained with reference to the drawings.

Figure 1B:
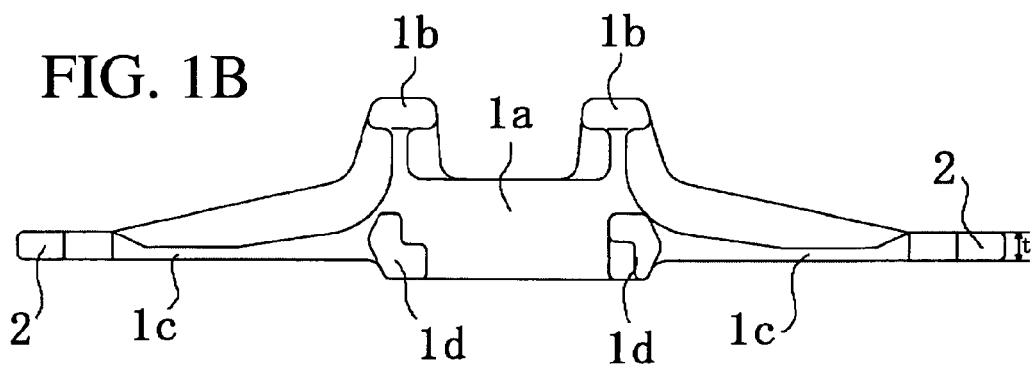
FIG. 1B is a front view thereof.
Figure 1C:
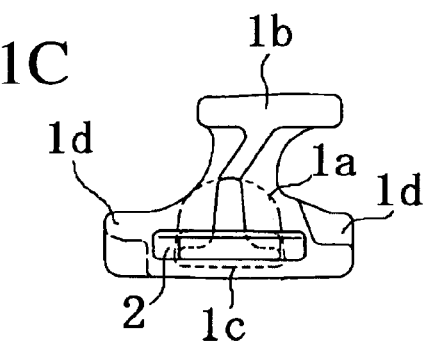
FIG. 1C is a side view thereof. (Example 1)
Figure 2:
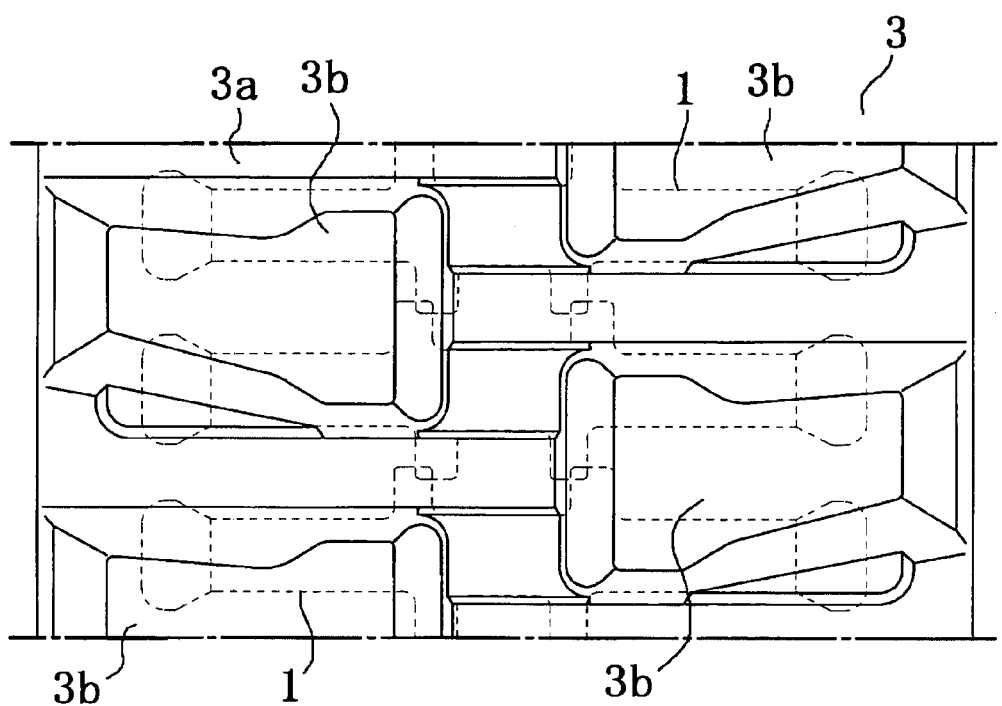
FIG. 2 is a plan view of an outside circumference of a rubber crawler in which the core bar of FIGS. 1A-1C is embedded.

FIGS. 1A-1C show a core bar used in a rubber crawler of a first example, in which FIG. 1A is a plan view of an inside circumference (side away from the tread), FIG. 1B is a front view, and FIG. 1C is a side view. FIG. 2 is a plan view of an outside circumference showing the core bar of FIG. 1 embedded in the rubber crawler of the first example.

A core bar 1 of the first example has an engagement part 1a engaging with the drive unit of the traveling device, the engagement part being formed in a central part of the core bar. At both right and left external sides of the engagement part 1a in the longitudinal direction of the core bar, a pair of guide protrusions 1b for preventing wheels from coming off are shifted relative to one another and arranged in a zigzag. Wing parts 1c are formed at both external sides.

Numeral 1d in the figures is a protrusion for preventing the core bar from coming off, and for regulating lateral displacement and torsion of the rubber crawler.

In the core bar 1 of the invention, both longitudinal end edges of the core bar are made in enlarged width parts 2 that are wider than the width dimension of the core bar by elongating the tips of the wing parts 1c of the core bar to beyond the width dimension of the core bar. The enlarged width parts 2 each have a height equal to the minimum height of the wing part 1c.

The core bar 1 is embedded in a rubber crawler main body 3a of a rubber crawler 3 in FIG. 2. When the core bar 1 is embedded in the rubber crawler, the enlarged width parts 2 are arranged at the end parts in the lateral direction of the rubber crawler. According to this, it is possible to diminish the load per unit width (unit area) of the longitudinal end parts of the core bar, and therefore, the distortion thereof can be dispersed when the rubber crawler rides over stones and curbstones. Rubber destruction is prevented by relieving the concentration of the distortion, thereby effectively diminishing the end-cutting phenomenon. Accordingly, the core bar can enhance the durability of the rubber crawler. The numeral 3b is a lug.

Although it is effective to make the width dimension $W_2$ of the enlarged width part 2 of the core bar great, it is necessary to make the width dimension $W_2$ shorter than the dimension of the interval between embedded core bars in the rubber crawler, because the enlarged width parts interfere with enlarged width parts of adjacent core bars when the width dimension is greater than the dimension of the interval between the embedded core bars (one pitch=1P). The effect decreases if the width dimension $W_2$ is too short. Therefore, it is better to make the width dimension $W_2$ in a range of 1.1 $W_1$-1.8 $W_1$, preferably 1.2 $W_1$-1.5 $W_1$, where $W_1$ is the width dimension of the wing part 1c of the core bar laterally inside the tip. In the usual rubber crawler, the width dimension $W_1$ of the wing part 1c is made almost a half (0.5P) of the dimension of the interval between embedded core bars.

The length L of the enlarged width part 2 of the core bar can be set to an adequate dimension in accordance with use conditions. However, if the length L is too short, the strength of the portion of the enlarged width part elongated beyond the wing part of the core bar can not be maintained. On the other hand, if the length L is too long, the weight of the core bar is increased and that of the rubber crawler is also increased, and therefore, much material is required for the core bars.

Example 2

Figure 3A:
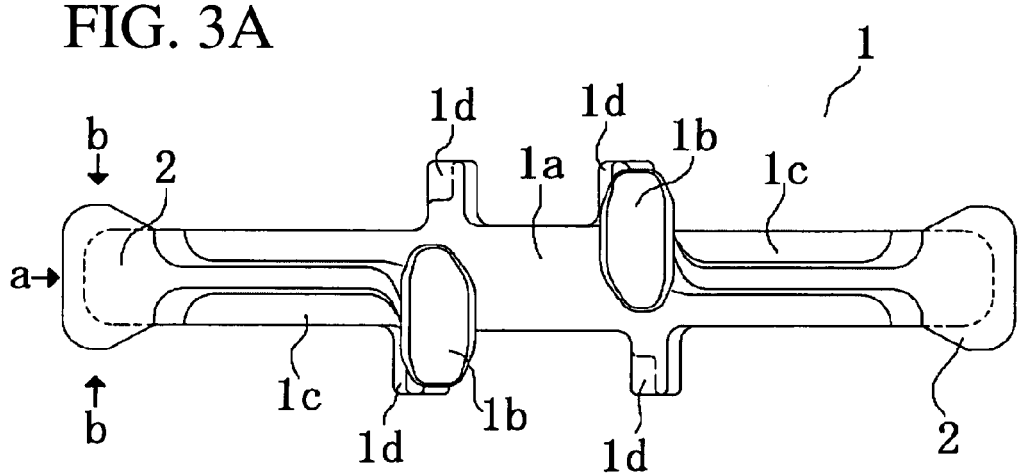
FIG. 3A is a plan view of an inside circumference of a second embodiment of a core bar according to the present invention.
Figure 3B:
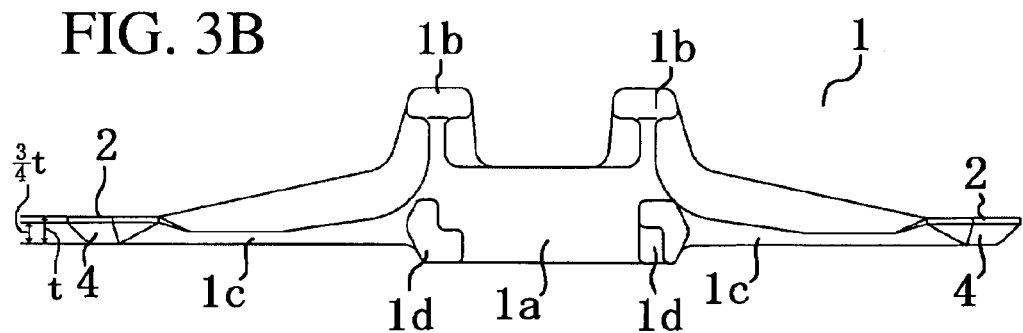
FIG. 3B is a front view thereof.
Figure 3C:
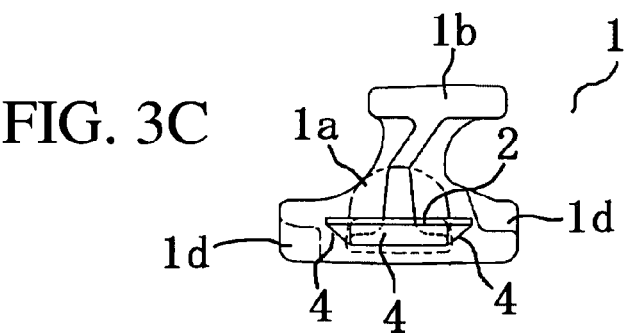
FIG. 3C is a side view thereof.
Figure 4A:
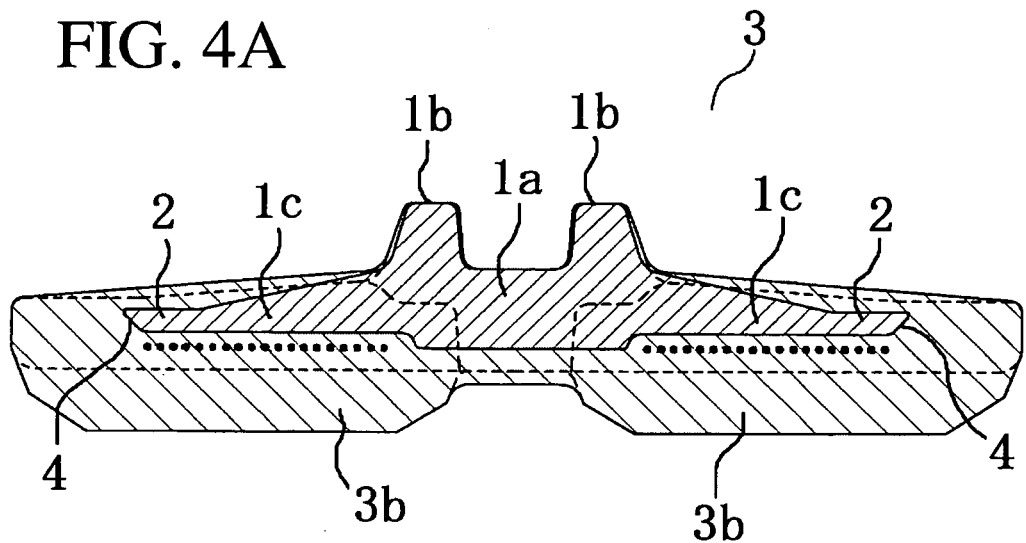
FIG. 4A is a sectional view, in a width direction, of a rubber crawler in which a plurality of the core bars of FIGS. 3A-3C is embedded.
Figure 4B:
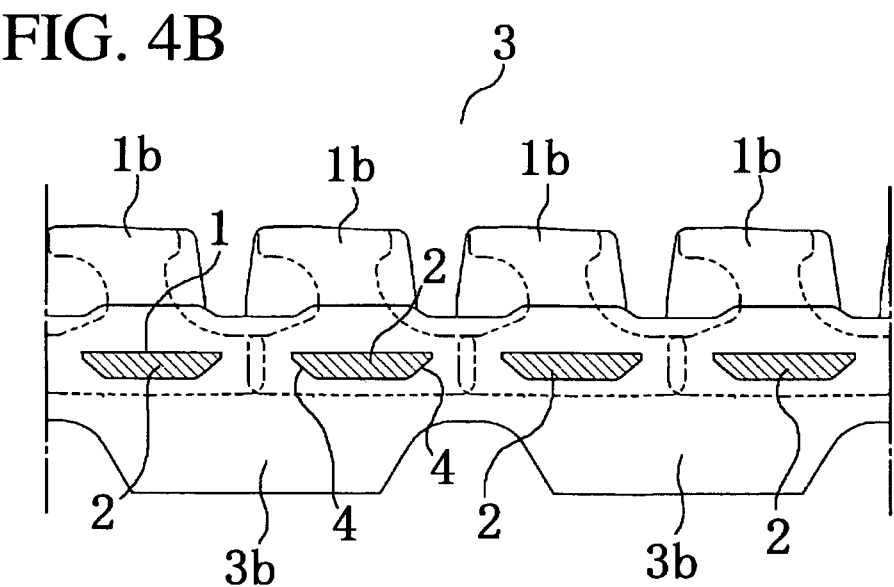
FIG. 4B is a sectional view, in a longitudinal direction, of the rubber crawler in which a plurality of the core bars of FIGS. 3A-3C is embedded.

FIGS. 3A-3C show a core bar of a second embodiment of the invention. FIG. 3A is a plan view of an inside circumference, FIG. 3B is a front view, and FIG. 3C is a side view. FIGS. 4A and 4B show a rubber crawler in which core bars of the second embodiment of the invention are embedded. FIG. 4A is a sectional view in the crawler lateral direction, and FIG. 4B is a partial sectional side view.

The core bar 1 of the second embodiment has enlarged width parts 2 which the tip range of the wing part 1c of the core bar is longer than the dimension of the central portion of the core bar to the outside of the width dimension of the core bar. In addition, partial or overall inclinations (tapers) 4 are formed on the tread sides of the crawler by decreasing the thickness of the core bar in the enlarged width parts 2 toward the external end edges. In the case of partial inclination, the thickness is made half of the thickness t, that is, ½t, or more (¾t in this example). The enlarged width parts 2 each have a height equal to the minimum height of the wing part 1c.

In the second embodiment as shown in FIG. 3, it is preferable to form the inclinations 4 on both a longitudinal end edge part 'a' and width directional end edge parts 'b' of the enlarged width part 2 of the core bar. However, an inclination 4 may be formed on either of the end edge parts, or the inclinations 4 may have a different angle at each end edge.

Figure 5A:
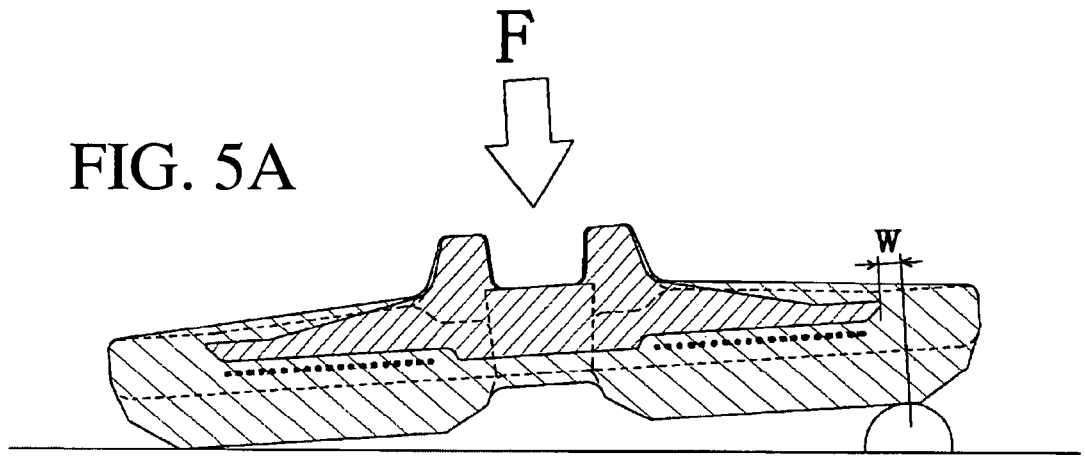
FIG. 5A is a sectional view showing an end in a lateral direction of the rubber crawler riding over a curbstone.
Figure 5B:
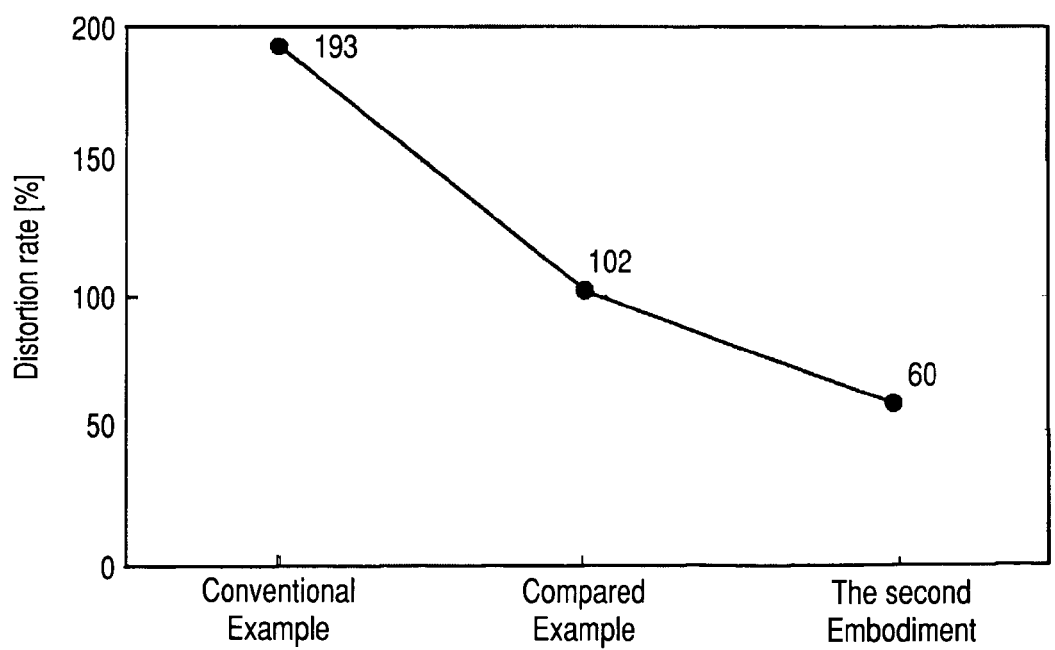
FIG. 5B is a test result of distortion rate when the end in the lateral direction of the rubber crawler rides over the curbstone.

FIGS. 5A and 5B show, respectively, a test method and a test result for measuring the distortion rate when the lateral end parts of the rubber crawler ride over a curbstone. FIG. 5A is a sectional view showing the test method, and FIG. 5B is a graph showing the test results of the distortion rate.

Figure 13A:
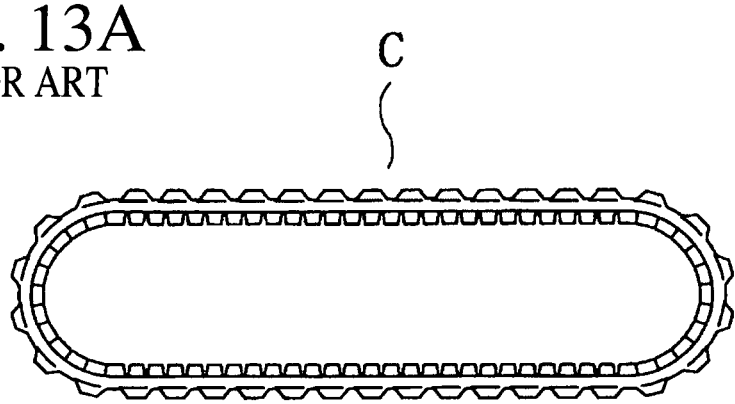
FIG. 13A is a side view of a whole conventional rubber crawler.
Figure 13B:
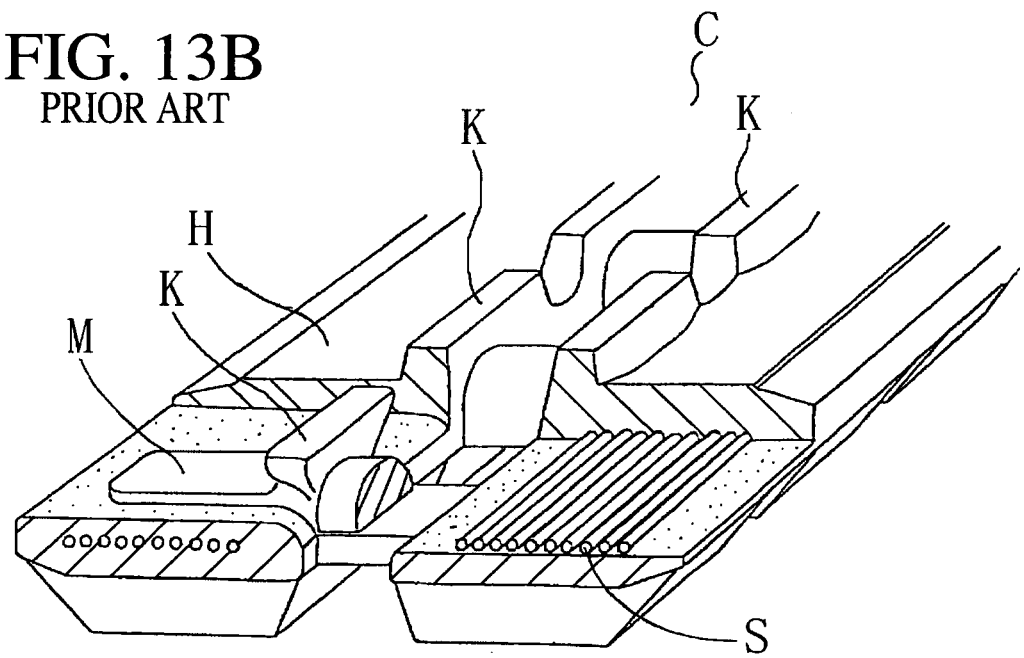
FIG. 13B is a partly sectional perspective view for explaining the structure of the rubber crawler.
Figure 14A:
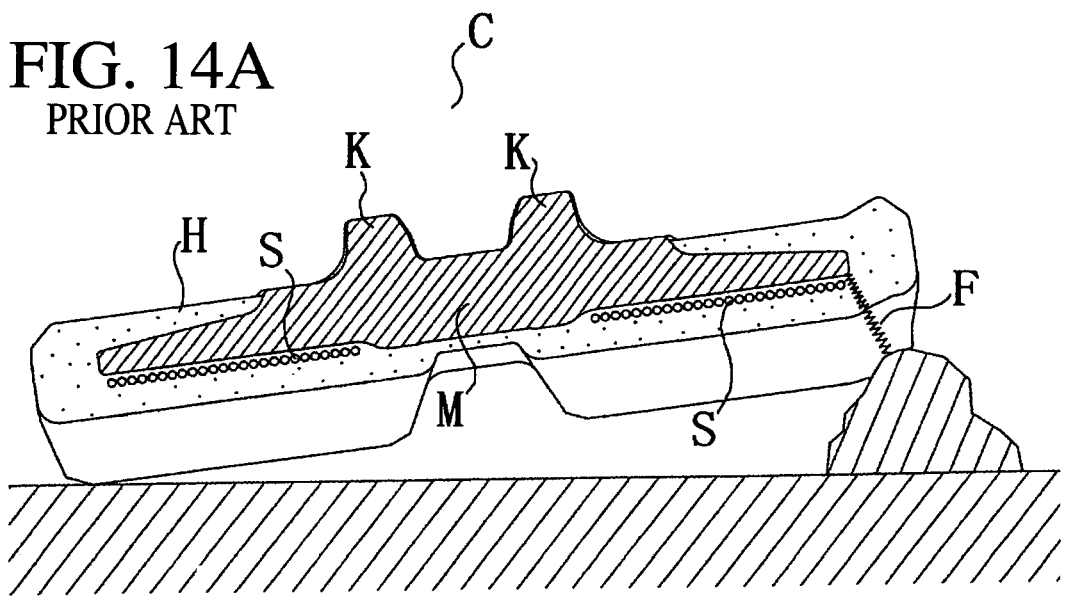
FIGS. 14A and 14B are sectional views in the width direction of a conventional rubber crawler, showing conditions in which end-cutting of the rubber crawler is produced.
Figure 14B:
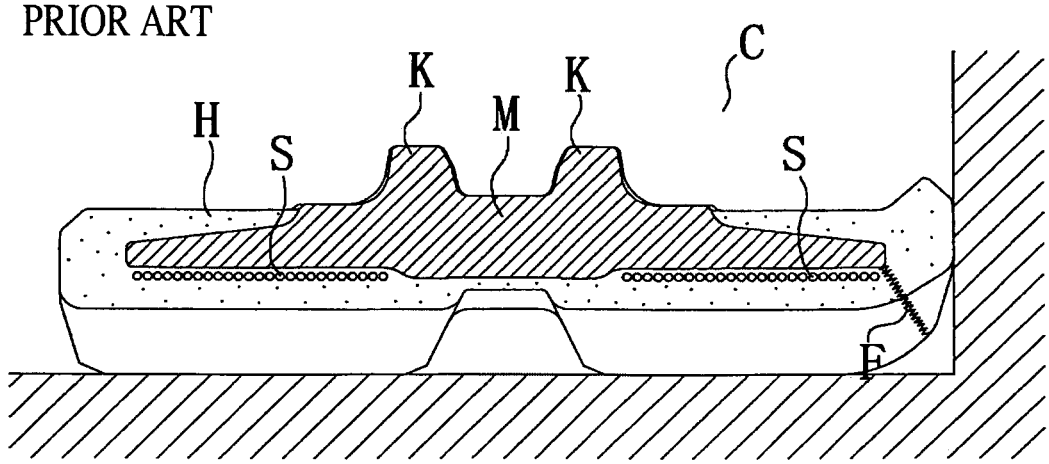

The level of distortion is measured for a) the rubber crawler of the second embodiment, b) a general rubber crawler shown in FIG. 13 as a conventional example, and c) a rubber crawler disclosed in FIGS. 5 to 7 of Japanese Patent Laid-open Application No. 11-105754 in which core bars (bent part is formed at the tip end of the longitudinal end part of the core bar) using conventional measures to deal with end-cutting are embedded as a comparative example.

As shown in FIG. 5A, the distortion rate is measured when a semicircular obstacle is put right below a position spaced by the distance W (10 mm) from the longitudinal end of the core bar, and a load F (500 Kg) is placed on the core bar.

As shown in the graph, the distortion rate of the conventional rubber crawler is 193%, that of the rubber crawler of the comparative example is 102%, and that of the rubber crawler of the second embodiment is 60%, which is one third of the conventional example and smaller than the comparative example.

According to the invention, the distortion of the end part of the rubber crawler in the lateral direction, which is generated when the rubber crawler rides on a foreign object, is remarkably improved in the rubber crawler according to the present invention in comparison with the conventional rubber crawler and a rubber crawler using the conventional end-cutting countermeasure, thereby reducing the end-cutting generated on the rubber crawler, as well as enhancing durability.

Example 3

Figure 6A:
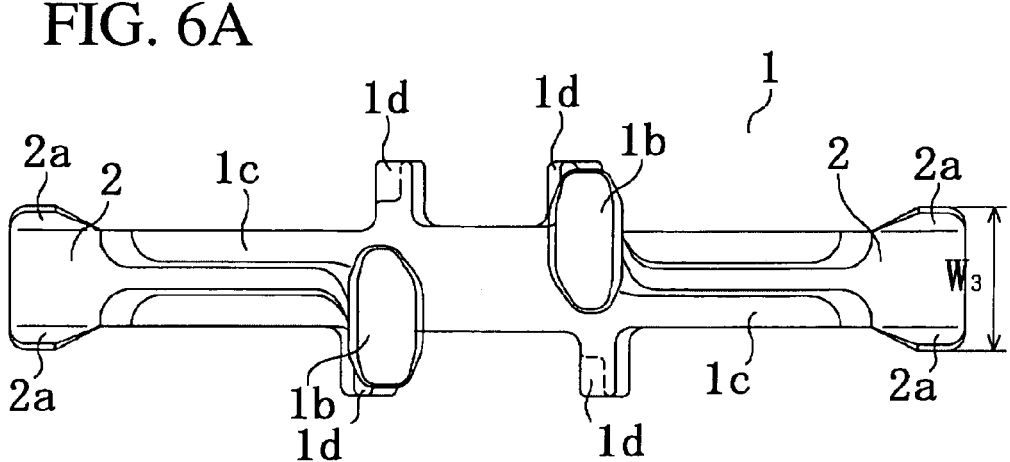
FIG. 6A is a plan view of an inside circumference of a third embodiment of a core bar according to the present invention.
Figure 6B:
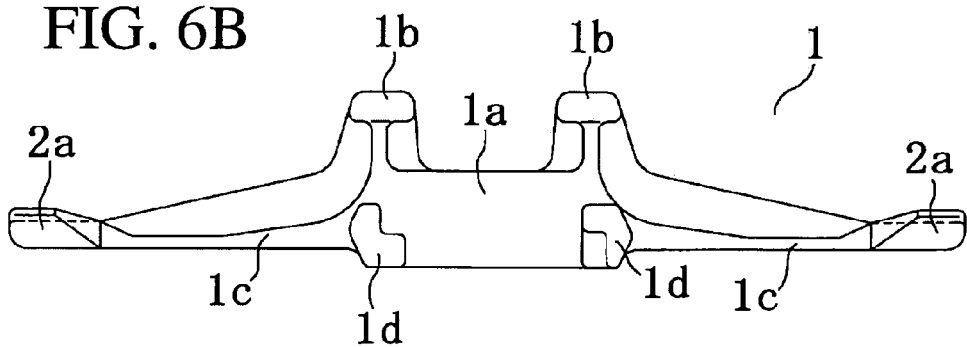
FIG. 6B is a front view thereof.
Figure 6C:
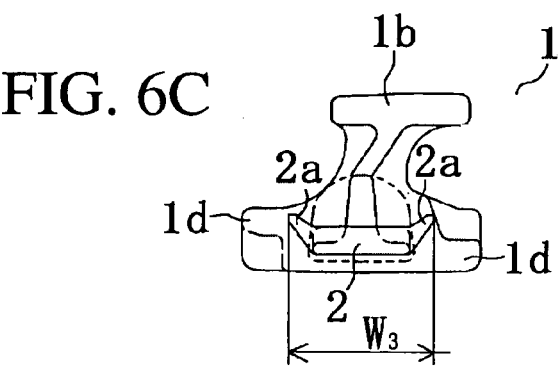
FIG. 6C is a side view thereof.

FIGS. 6A-6C show a core bar of a third embodiment of the invention. FIG. 6A is a plan view of an inside circumference, FIG. 6B is a front view, and FIG. 6C is a side view.

The core bar 1 of the third embodiment is so constructed that the enlarged width parts 2 are formed by elongating the tip end parts of the wing parts 1c of the core bar to beyond the width dimension of the wing parts 1c of the core bar, bent parts 2a are formed by bending the elongated portions of the core bar in the enlarged width parts 2 in the direction of the inside circumference of the crawler, and the end edge parts of the core bar in the crawler circumferential direction are bent so that inclinations formed by bending face the tread side.

In this case, since the enlarged width parts 2 are bent, the bent parts 2a are spaced from steel cords of a base point for winding of the rubber crawler to the inside circumference. Therefore, unless the width dimension $W_3$ of the enlarged width parts 2 of the core bar is made shorter than the interval between the embedded core bars (1P), the enlarged width parts 2 of the adjacent core bars interfere with each other, and the rubber crawler can not wind around an idler wheel and a driving wheel of the traveling device.

It is necessary to make the width dimension $W_3$ of the core bar shorter than the dimension obtained by subtracting an interval (p) from the interval 1P between the embedded core bars ($W_3$<1P−p) so that the enlarged width parts 2 do not interfere with each other at the interval between the embedded core bars (1P).

The interval p is formulated by p=2 h·sin(180/n)°, in which the dimension from the steel cords to the tip end of the inside circumference of the bent part 2a of the enlargement width part 2 is "h" and the number of teeth of the driving wheel is "n".

Example 4

Figure 7A:
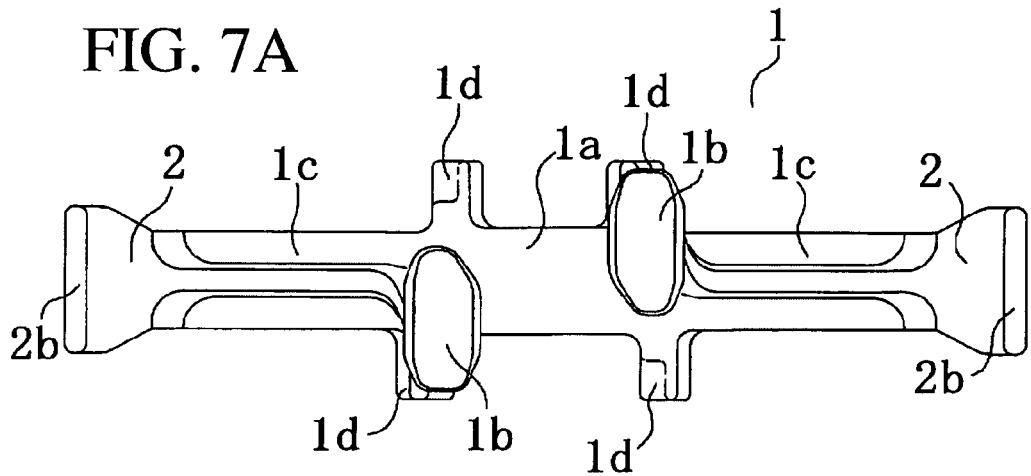
FIG. 7A is a plan view of an inside circumference of a fourth embodiment of a core bar according to the present invention.
Figure 7B:
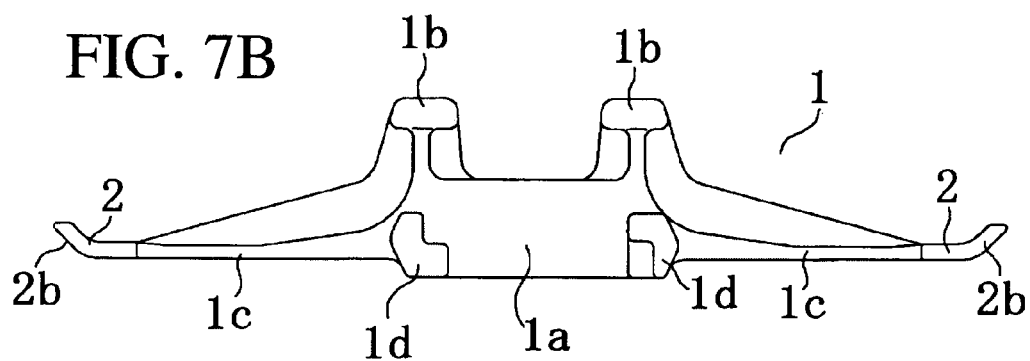
FIG. 7B is a front view thereof.
Figure 7C:
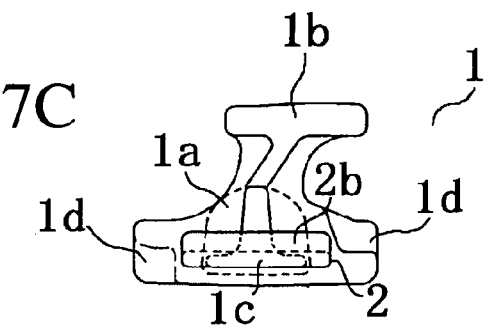
FIG. 7C is a side view thereof.

FIGS. 7A-7C show a core bar of a fourth embodiment of the invention. FIG. 7A is a plan view of an inside circumference, FIG. 7B is a front view, and FIG. 7C is a side view.

The core bar 1 of the fourth embodiment is so constructed that the enlarged width parts 2 are formed by elongating the tip end parts of the wing parts 1c of the core bar beyond the width dimension of the core bar, bent parts 2b are formed by bending the longitudinal end parts of the enlargement width parts 2 of the core bar in the direction of the inside circumference of the crawler, and the end edge parts of the core bar in the crawler lateral direction are bent so that inclinations formed by bending face the tread side.

Example 5

Figure 8A:
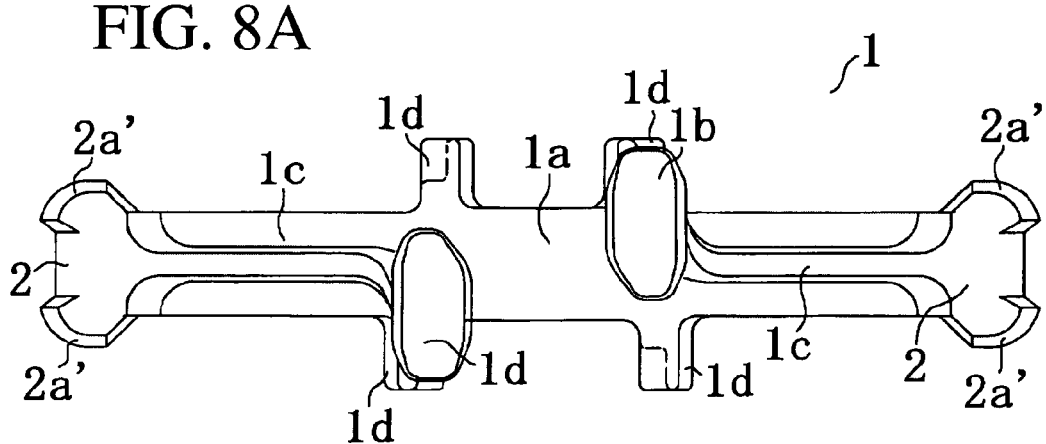
FIG. 8A is a plan view of an inside circumference of a fifth embodiment of a core bar according to the present invention.
Figure 8B:
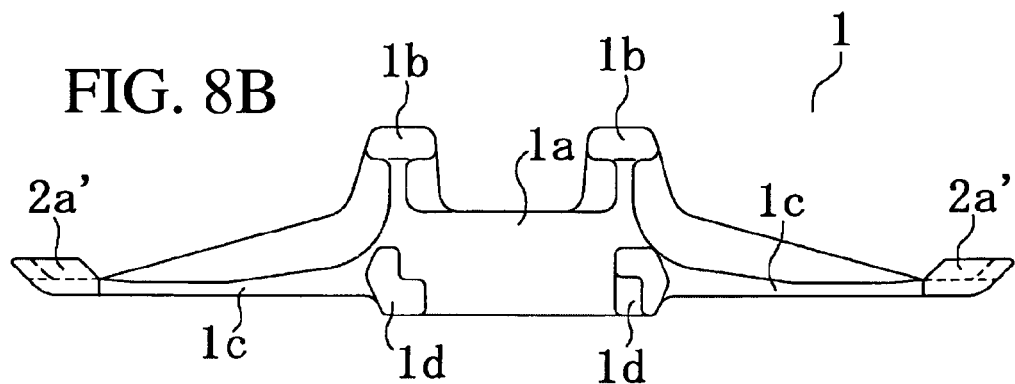
FIG. 8B is a front view thereof.
Figure 8C:
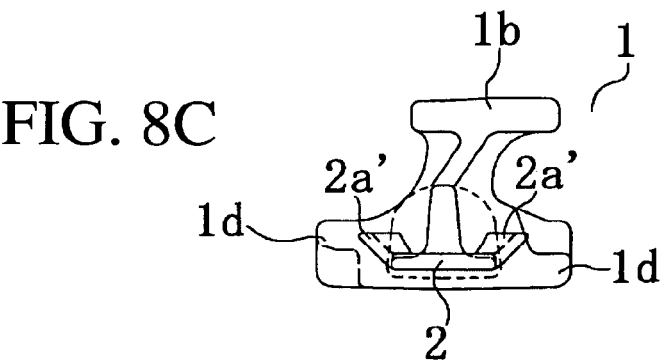
FIG. 8C is a side view thereof.

FIGS. 8A-8C show a core bar of the fifth embodiment of the invention. FIG. 8A is a plan view of an inside circumference, FIG. 8B is a front view, and FIG. 8C is a side view.

The core bar 1 of the fifth embodiment is so constructed that the enlarged width parts 2 are formed by elongating the tip end parts of the wing parts 1c of the core bar to the outside of the width dimension of the core bar, and ogival bent parts 2a' are formed by bending the longitudinal tip end parts of the core bar of the enlargement width parts 2 in the direction of the inside circumference of the crawler as well as by bending parts from the corneous parts in the width direction of the core bar to a part of the longitudinal tip end part of the core bar.

Accordingly, the distortion of both front and rear corneous parts in the width direction of the core bar can be relieved, and the durability against the end-cutting can be enhanced.

Figure 9A:
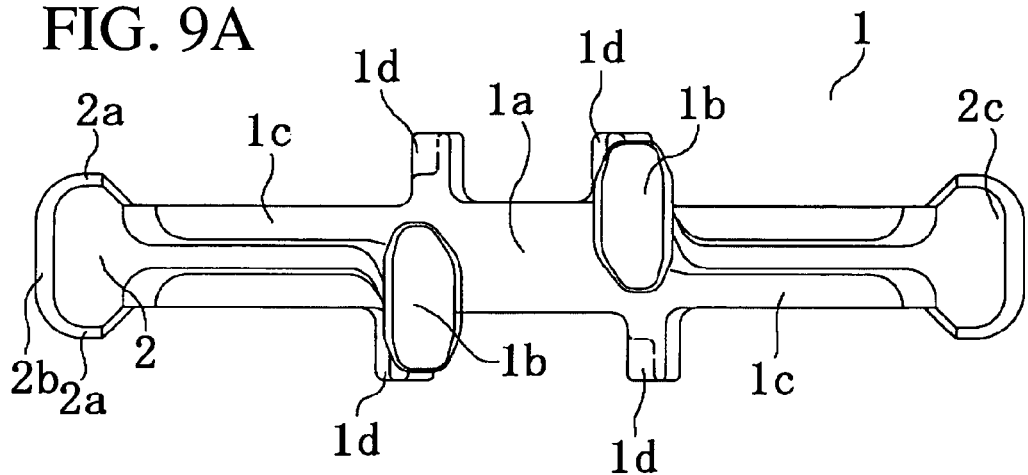
FIG. 9A is a plan view of an inside circumference of another example of the fifth embodiment of a core bar according to the present invention.
Figure 9B:
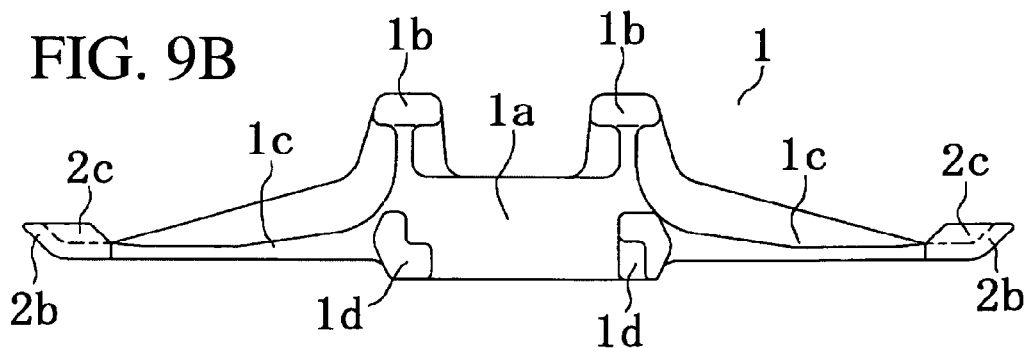
FIG. 9B is a front view thereof.
Figure 9C:
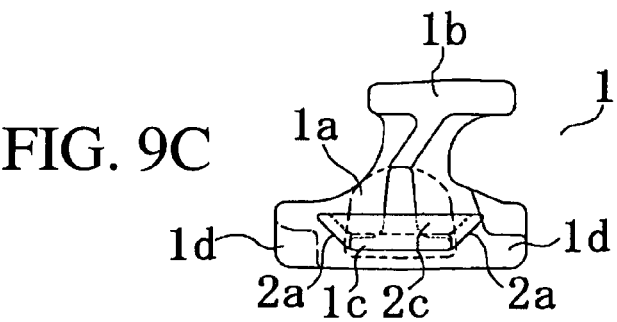
FIG. 9C is a side view thereof.

In this case, as shown in FIG. 9, a navicular bent part 2c may be formed by bending the whole longitudinal tip end part of the core bar of the enlarged width part 2 so as to be connected to bent parts formed on both ends in the width direction of the core bar, namely by bending the end edge parts of the core bar in the crawler longitudinal direction, the crawler width direction and the corner parts thereof so that the tip end parts of the wing parts 1c of the core bar are formed in a navicular shape.

Example 6

Figure 10A:
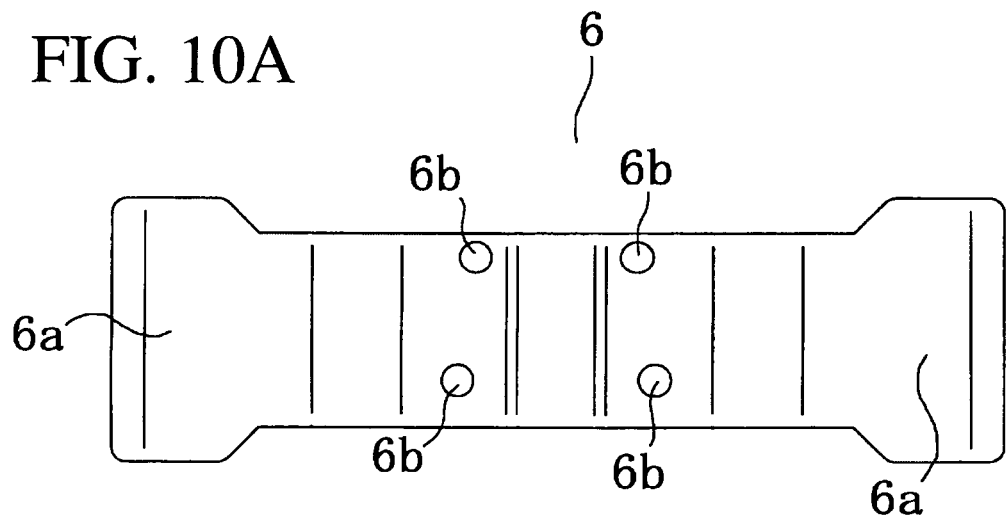
FIG. 10A is a plan view of a tread side of a sixth embodiment of a core bar according to the present invention.
Figure 10B:
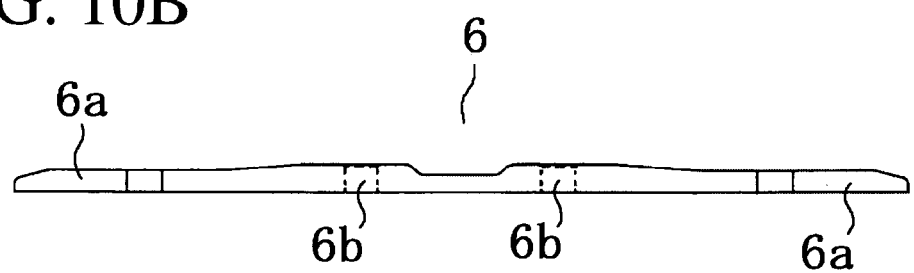
FIG. 10B is a front view thereof.
Figure 10C:
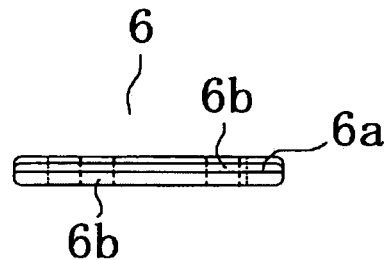
FIG. 10C is a side view thereof.
Figure 11A:
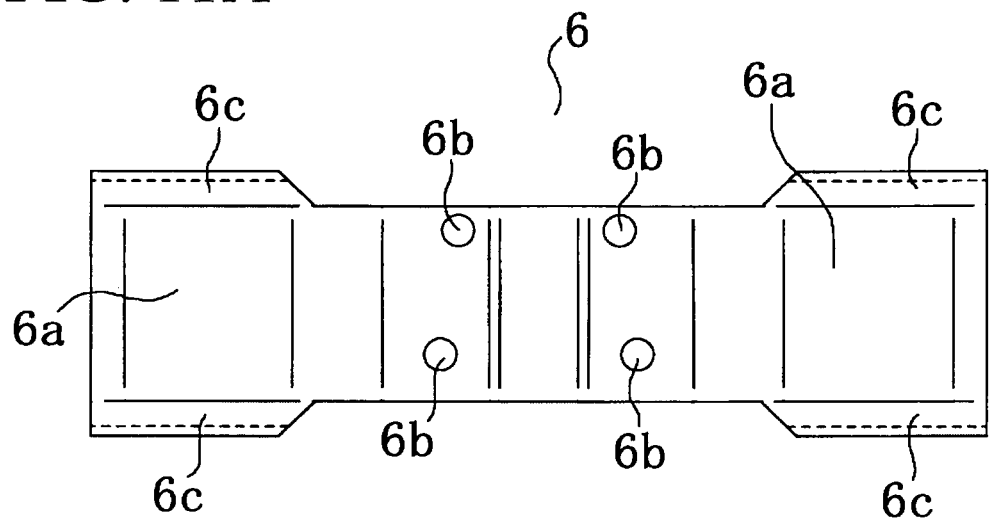
FIG. 11A is a plan view of a tread side of another example of the sixth embodiment of a core bar according to the present invention.
Figure 11B:
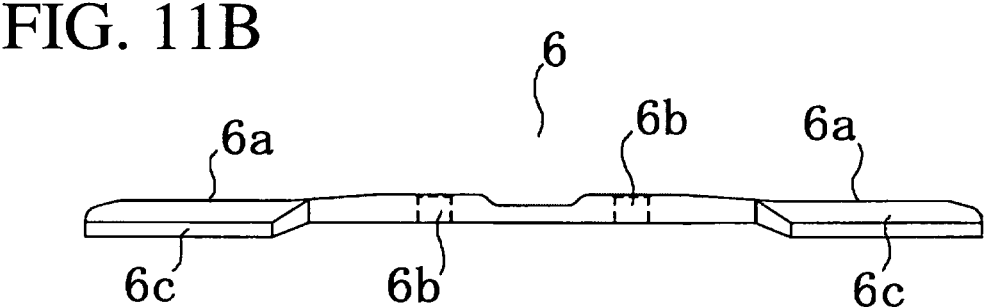
FIG. 11B is a front view thereof.
Figure 11C:
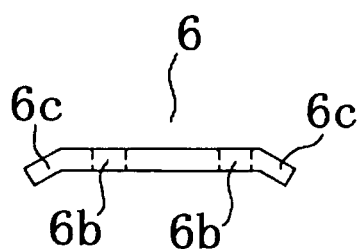
FIG. 11C is a side view thereof.
Figure 12A:
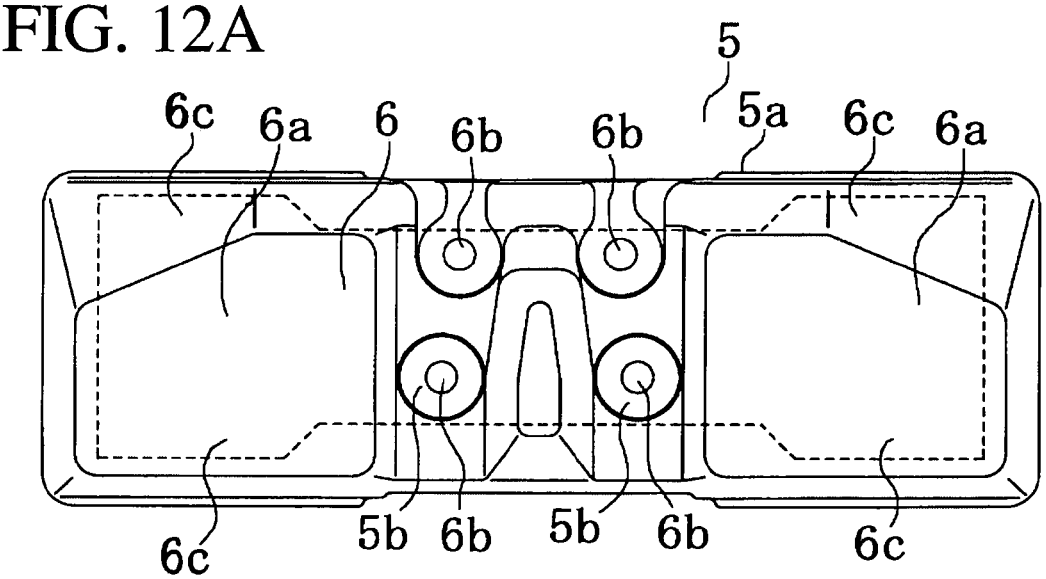
FIG. 12A is a plan view of a tread side of the core bar of FIG. 11 embedded in a caterpillar band pad.
Figure 12B:
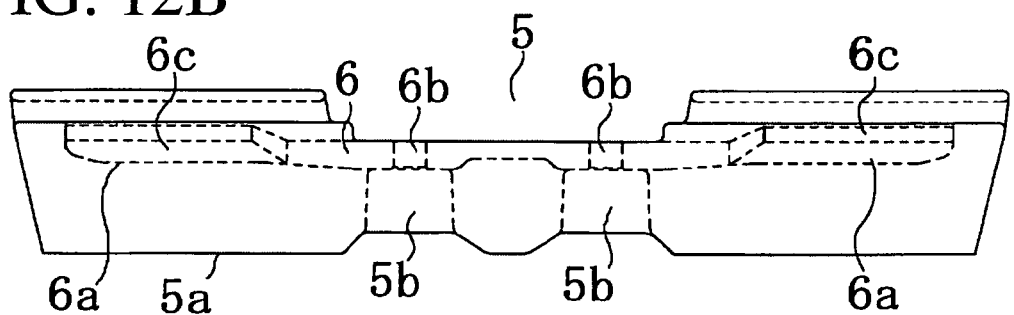
FIG. 12B is a front view thereof.
Figure 12C:
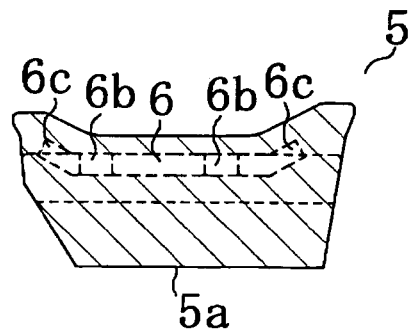
FIG. 12C is a side view thereof.

FIGS. 10A-10C and 11A-11C show a core bar for a connected links type rubber crawler of a caterpillar band pad type rubber crawler in which caterpillar band pads are fitted to connected track links. FIGS. 10A-10C show a core bar of the sixth embodiment. FIG. 10A is a plan view of a tread side of the core bar, FIG. 10B is a front view, and FIG. 10C is a side view. FIGS. 11A-11C show a core bar of another example of the sixth embodiment. FIG. 11A is a plan view of a tread side, FIG. 11B is a front view, and FIG. 11C is a side view. FIGS. 12A-12C show a caterpillar band pad of the connected links type rubber crawler in which the core bars of another example of the sixth embodiment shown in FIG. 11 are placed. FIG. 12A is a plan view of the tread side, FIG. 12B is a front view, and FIG. 12C is a side view.

A core bar 6 of the sixth embodiment shown in FIGS. 10A-10C is so constructed that enlarged width parts 6a are formed by elongating the longitudinal end parts of the core bar beyond the width dimension of the core bar. In FIGS. 10A-10C, 6b is a through hole in which a bolt for fitting the caterpillar band pad to the connected track links is inserted. The enlarged width parts 6a each have a height equal to the minimum height of the wing part 1c.

Besides, in the core bar 6 of another example of the sixth embodiment shown in FIGS. 11A-11C, the enlarged width parts 6a are formed by elongating the longitudinal end parts of the core bar beyond width dimension of the core bar, bent parts 6c are formed by bending the broadened portions of the enlargement width parts 6a in the direction of the inside circumference (the side away from the tread) of the crawler, and the end edge parts of the core bar in the crawler circumferential direction are bent so that the inclinations formed by bending face the tread side.

In FIGS. 12A-12C, the core bar 6 (crawler) of another example of the sixth embodiment shown in FIGS. 6A-6C is embedded in the caterpillar band pad 5 of the connected links type rubber crawler of a caterpillar band pad type rubber crawler which caterpillar band pads are fitted to the connected track links (not-illustrated) that a pair of track links are endlessly connected. A caterpillar band pad main body 5a of the caterpillar band pad 5 is formed from a rubber elastic body, and therein, the core bar 6 is embedded.

In FIGS. 12A and 12B, 5b is a bolt hole in which a bolt for fitting the caterpillar band pad to the connected track links is received.

The invention claimed is:

1. A core bar for a rubber crawler, wherein the core bar is embedded in a rubber crawler main body of a rubber elastic body, the core bar having a length, a width and a height, and comprising:

wing parts each having an external end edge; and enlargement width parts in the wing parts, the core bar having a longitudinal center and a width dimension that lies between the wing parts and the longitudinal center of the core bar, each of the enlargement width parts having a length, a width dimension extended beyond said width dimension of the core bar along the entire length of the enlargement width part, a face partially or wholly sloping toward a tread side of the crawler, and a height equal to the minimum height of the wing part.

2. The core bar according to claim 1, wherein each wing part has an external end edge, and each enlargement width part has a thickness, said thickness being diminished increasingly in a direction from a center of the enlargement width part to the external end edge of the wing part having the enlargement width part.

3. A core bar for embedding in a main body of a rubber crawler having a tread side, wherein the main body is made of a rubber elastic body, wherein the core bar has a length, a width, a height, an engagement part for engaging with a driving unit of a traveling device, wing parts extending longitudinally from the engagement part and having enlarged width parts, wherein the core bar has a width dimension that lies between the wing parts and the longitudinal center of the core bar, wherein the enlarged width parts are formed by extending the wing parts of the core bar in the width direction of the core bar to beyond the width dimension of the core bar along the entire length of the enlargement width part, whereby cracks are prevented in the rubber crawler adjacent to the longitudinal end parts, wherein each enlargement width part has a height equal to the minimum height of the wing part, and wherein the enlargement width parts are adapted to be embedded entirely in the main body of a rubber crawler.

4. The core bar according to claim 3, wherein each of the wing parts has an external end edge, and the thickness of each of the enlarged width parts is diminished increasingly in a direction from a center of the enlargement width part to the external end edge to form an inclination facing toward the tread side of the crawler.

5. A core bar for embedding in a main body of a rubber crawler having a tread side, wherein the main body is made of a rubber elastic body, wherein the core bar has a length, a width, a height, wing parts, and enlarged width parts, wherein the core bar has a width dimension that lies between the wing parts and the longitudinal center of the core bar, wherein each of the enlarged width parts has an inclination facing a tread side of the crawler and a height equal to the minimum height of the wing part, and wherein the enlarged width parts are formed by extending the wing parts of the core bar in the width direction of the core bar to beyond the width dimension of the core bar along the entire length of the enlargement width part.

6. In combination, a rubber crawler and a core bar for embedding in the rubber crawler,
   wherein the rubber crawler has a rubber elastic main body and a tread side, and
   wherein the core bar has a length, a width, a height, an engagement part for engaging with a driving unit of a traveling device, wing parts extending longitudinally from the engagement part and having enlarged width parts, wherein the core bar has a width dimension that lies between the wing parts and the longitudinal center of the core bar, wherein the enlarged width parts are formed by extending the wing parts of the core bar in the width direction of the core bar to beyond the width dimension of the core bar along the entire length of the enlargement width part, whereby cracks are prevented in the rubber crawler adjacent to the wing parts, wherein each enlargement width part has a height equal to the minimum height of the wing part, and wherein the enlargement width parts are embedded entirely in the main body of a rubber crawler.

7. The core bar according to claim 1, further comprising an engagement part adjacent to the longitudinal center of the core bar and adapted to engage with a driving unit of a traveling device having a crawler, wherein the enlargement width parts are spaced longitudinally from the engagement part.

8. The core bar according to claim 3, wherein the engagement part is positioned adjacent to the longitudinal center of the core bar, and the enlargement width parts are spaced longitudinally from the engagement part.

9. The core bar according to claim 5, further comprising an engagement part adjacent to the longitudinal center of the core bar and adapted to engage with a driving unit of a traveling device having a crawler, wherein the enlargement width parts are spaced longitudinally from the engagement part.

10. The combination according to claim 6, wherein the engagement part is positioned adjacent to the longitudinal center of the core bar, and the enlargement width parts are spaced longitudinally from the engagement part.

* * * * *